INVENTOR.
GEORGE H. FATHAUER,
BY: George A. Gust.
ATTORNEY.

May 4, 1954 G. H. FATHAUER 2,677,769

HIGH-FREQUENCY CIRCUIT CHASSIS

Filed March 9, 1951 2 Sheets-Sheet 2

INVENTOR.
GEORGE H. FATHAUER,
BY:
George A. Gust
ATTORNEY.

Patented May 4, 1954 2,677,769

UNITED STATES PATENT OFFICE 2,677,769

HIGH-FREQUENCY CIRCUIT CHASSIS

George H. Fathauer, Indianapolis, Ind., assignor to Industrial Development Engineering Associates, Inc., Indianapolis, Ind., a corporation of Indiana Application March 9, 1951, Serial No. 214,803

16 Claims. (Cl. 250—40)

This is a continuation-in-part of my application Serial No. 143,131 filed February 8, 1950, now abandoned.

The present invention relates to a high radio frequency device and more particularly to a fixture which serves the dual purpose of providing a chassis and component parts for a radio circuit.

A principal object of this invention is to provide a radio circuit chassis having formed integrally therewith certain component parts of the circuit. In the accomplishment of this object, a sheet metal chassis may be produced by the simple operation of stamping with certain portions thereof being lanced and formed to a predetermined shape to provide elements for use as parts of capacitors and inductors, both serving as possible supporting structure for other components of the circuitry.

It is therefore another object to provide a simple, economical, and reliable supporting structure for a radio circuit which may be formed to provide circuit components such as inductors and/or capacitors.

A further object is to provide in a resonant circuit inductive and capacitive elements which are integral with the chassis.

A still further object is to provide a basic unit of a radio oscillator which contributes appreciably toward stabilizing the frequency thereof and enables holding the frequency to within acceptable limits within, for example, the range of 400 to 500 megacycles. Owing to the characteristic frequency stability realized from use of the present invention, it is possible to produce a high frequency oscillator or transmitter which is extremely simple in physical design, comparatively simple to manufacture, and reliable in its operation.

Other objects will become apparent as the description proceeds.

In the drawings.

Referring to the drawings it should be noted that the physical counterparts of the electrical components of the oscillator circuit of Figure 2 will carry the same reference numerals in the other figures.

Figure 1:
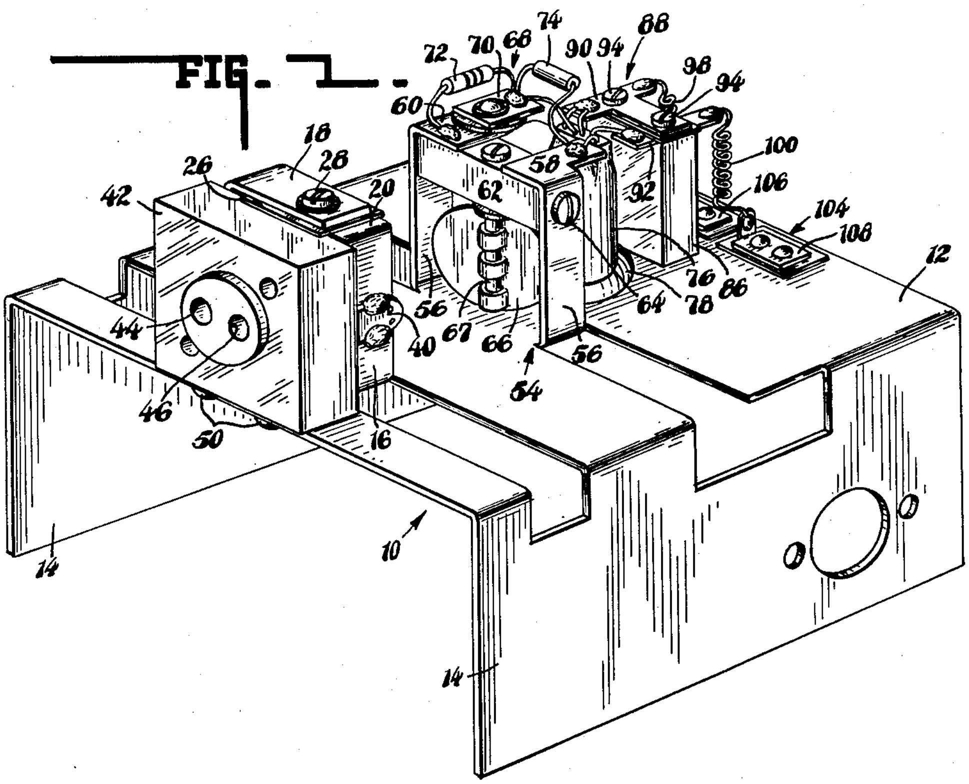
Figure 1 is a perspective view of an embodiment of the present invention.

The chassis 10 of the present invention is formed of sheet metal by stamping and is constituted by a base plate 12 and downwardly bent side flanges 14, and is preferably copper plated. From one end section of the chassis is symmetrically struck a pair of elongated segments 16 which are bent upwardly and inwardly with the ends 18 and 20, respectively, thereof overlapping for a purpose to become apparent hereafter. These struck segments so formed provide a coupling coil or inductance 22 while the overlapping ends thereof provide the plates of a capacitor 24 which may be adjustably separated by means of a mica strip 26 and a nut and screw combination 28.

Figure 5:
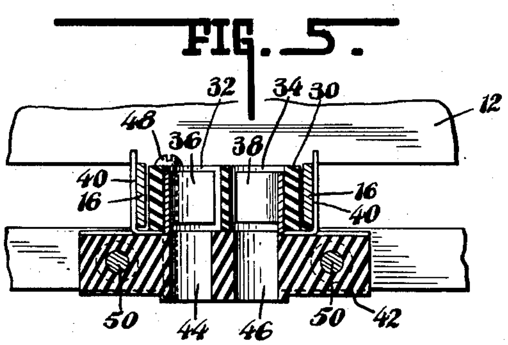
Figure 5 is a fragmental section taken substantially on section line 5—5 of Fig. 4.
Figure 4:
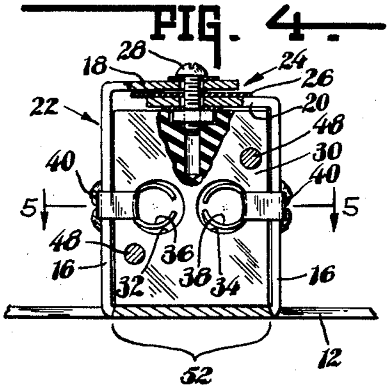
Figure 4 is a sectional view taken substantially on section line 4—4 of Fig. 3.

Referring more specifically to Figures 4 and 5, a rectangular insulating support block 30 formed of polystyrene or the like is fitted inside coil 22 and is recessed to accept and hold against rotation the nut of assembly 28. A pair of horizontally disposed openings 32 and 34 are formed in the central portion of the block 30 and receive, respectively, spring socket connections 36 and 38. Each connection is provided with a lug which is bent around the respective portion of block 30 to be soldered to the vertical center portion 40 of a respective side of coil 22. Thus the coil 22 is symmetrically tapped both physically and electrically, approximately mid-length of sides 16, for coupling an antenna network or the like thereto. A larger reinforcing polystyrene block 42 is supported against the outer face of block 30 and is provided with openings 44 and 46 which register with openings 32 and 34, respectively. A pair of screws 48 may be used to secure the two blocks together, and another pair of screws 50 may be used to secure block 42 to chassis 10.

Because of this manner of forming coil 22, a convenient ground connection 52 is established and is as symmetric with respect to the coupling taps 40 as commonly used production techniques will allow. Also, the value of the capacitance 24 is readily and conveniently controlled by this particular construction and is easily held within desired tolerance limits. The combination of the coil 22 and capacitor 24 being of substantially the same material and of the same structure is obviously desirable from both a manufacturing and electrical standpoint. Furthermore, since this coil and capacitor are self-supporting a further facility is realized.

Figure 3:
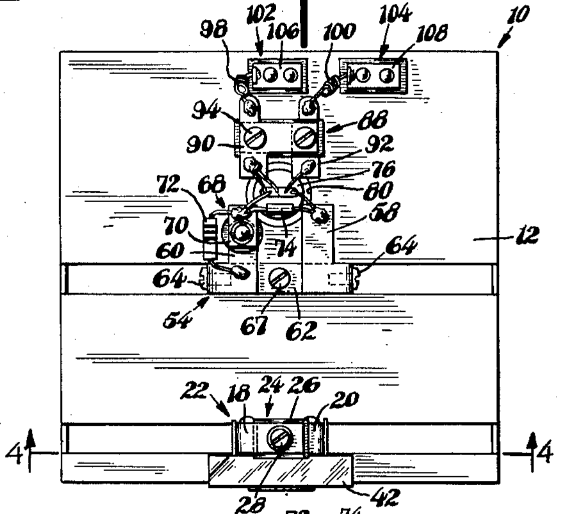
Figure 3 is a top plan view of Fig. 1.
Figure 6:
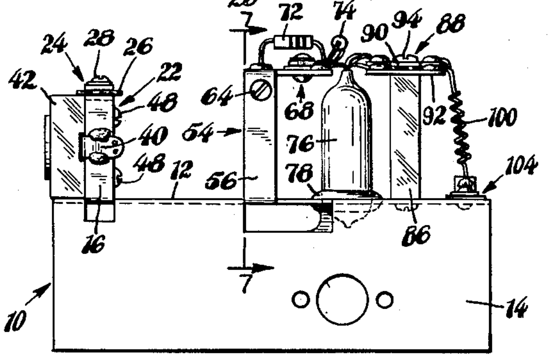
Figure 6 is a side elevation of Fig. 1.

Moving now to the next constructional feature of the embodiment of this invention, another inductor or coil 54 is struck from the bottom and side flanges of chassis 10 and has upright, parallel segments 56 and inwardly bent lugs 58 and 60 which are L-shaped as best illustrated in Figure 3. These lugs 58 and 60 do not overlap and are actually spaced apart and held in such position by means of a polystyrene or the like bridge 62 which abuts at its ends the upright segments 56. Screws 64 secure the bridge firmly to the segments 56.

An inductance-varying element or flux-shunting vane 66 is rotatable about a vertical axis by means of spindle 67 which is rotatably supported in bridge 62, vane 66 being thereby disposed substantially symmetrically within coil 54. By shifting the position of vane 66 the inductance of coil 54 is varied, thus a convenient tuning arrangement is made available.

The lug 60 of coil 54 is conveniently used as one plate of a capacitor 68, the other plate 70 of which is separated therefrom by a mica piece or the like. A resistor 72 in shunted across this capacitor 68, and a temperature compensating capacitor 74 is connected between plate 70 and coil lug 58 thereby completing the tank and grid circuits of the oscillator.

Figure 7:
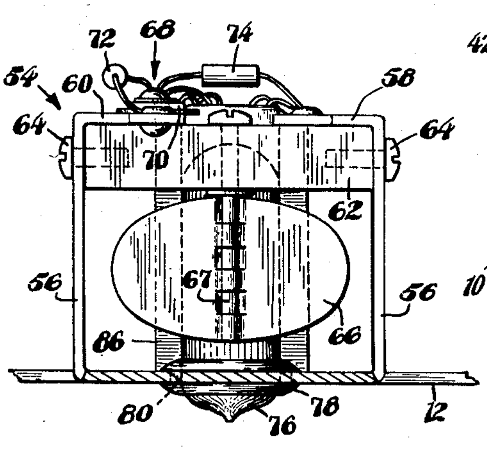
Figure 7 is a partial section taken substantially on section line 7—7 of Fig. 6.

Positioned contiguous to the ends of lugs 58 and 60 is an inverted vacuum tube 76 which has its normally upper end snugly received in a rubber or the like ring 78 (see Fig. 7) which lines an opening 80 in chassis 10. By mounting the tube in this manner, the leads therefrom are exposed immediately adjacent the lugs 58 and 60 thereby producing a minimum of lead length and undesirable lead inductance. The anode 82 of the tube is connected to lug 58 and the control grid 84 to plate 70 of capacitor 68.

Figure 2:
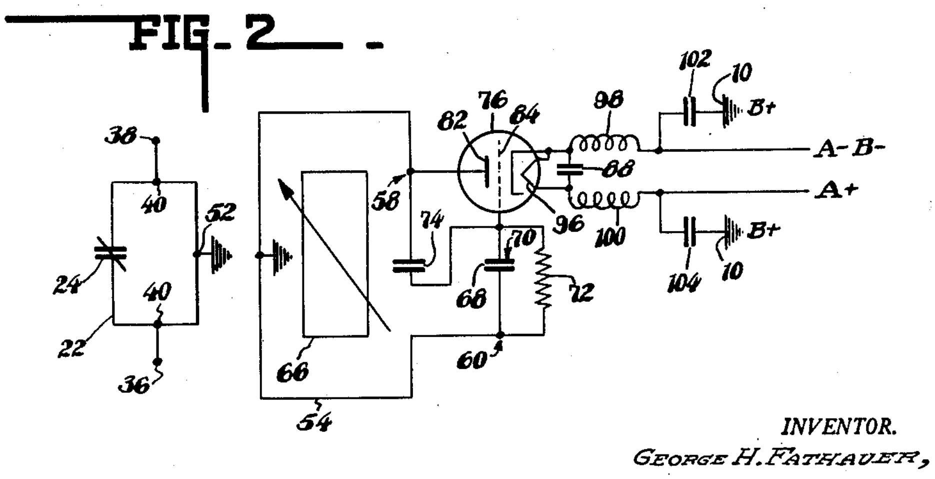
Figure 2 is a diagrammatic equivalent of the embodiment of Fig. 1.

Another rectangular polystyrene block 86 is fixedly secured to chassis 10 adjacent tube 76 on the side opposite coil 54 and carries on its upper edge surface a capacitor 88 which is formed by two small metal plates 90 and 92 separated by means of a strip of mica and held in position by means of screws 94. As seen in Fig. 2, capacitor 88 is connected across the heater 96 of tube 76, here again the physical lead connections being desirably short for the reason stated above. From the plates 90 and 92 of capacitor 88 are connected miniature inductors 98 and 100, respectively, which are in turn connected at the other ends of respective capacitors 102 and 104. These latter mentioned capacitors are conveniently formed by the small upper plates 106 and 108 and the chassis 10, mica being used as the dielectric. The juncture of each inductor 98, 100 and capacitor 102, 104 constitutes a readily accessible connecting point for the heater supply potential for tube 76. As shown in Fig. 2, the positive anode potential is connected to the chassis or ground while the negative anode potential is connected at the negative filament supply point.

The electrical device just described is an oscillator or transmitter which is capable of functioning in accordance with relatively rigid frequency stability requirements at a frequency of 465 megacycles. This frequency may be accurately adjusted by means of the vane 66. The radio frequency energy appearing at coil 54 is inductively coupled to antenna coil 22, and optimum coupling is made possible by the adjustable capacitor 24. Slight variations in the electrical values of the parts near the vicinity of the exposed base of tube 76 caused by the heat radiated by tube 76 may be compensated for by means of capacitor 74 which varies in capacity as its temperature changes.

While the oscillator above described performs with adequate frequency stability, it is seen that its constructional features are extremely simple, rugged, and compact, all of these features conducing to the aforementioned desirable performance.

While the above described embodiment of the present invention has been illustrated and described, it is to be understood that this inventon may be embodied in other forms as defined by the claims appended hereto.

I claim as my invention:

1. A radio frequency device including a stamped metal chassis having two separate inductors integrally formed therewith which are arranged to provide inductive coupling therebetween, one of said inductors having overlapping end portions electrically separated to provide a capacitor in series with said one inductor.

2. A radio frequency device including a stamped metal chassis having two separate inductors integrally formed therewith which are arranged to provide inductive coupling therebetween, one of said inductors having overlapping end portions electrically separated to provide a capacitor in series with said inductor, an adjusting member carried by said ends for varying the capacity of said capacitor.

3. A radio frequency device including a metal chassis having an inductor integrally projecting therefrom, a support formed of insulating material and fitted inside said inductor, and coupling means carried by said support and being electrically connected to said inductor.

4. A radio frequency device including a metal chassis having an inductor integrally projecting therefrom, a support formed of insulating material and fitted inside said inductor, and two connecting members carried by said support and being symmetrically electrically connected to said inductor for coupling a load thereto.

5. A radio frequency device including a metal chassis saving an inductor integrally projecting therefrom, a support formed of insulating material fitted inside said inductor, said support having two spaced openings formed therein, and two connectors being carried in said openings, said connectors being connected to separated points on said inductor for coupling a load thereto.

6. A radio frequency device including a stamped metal chassis having two separate inductors integrally formed therewith which are arranged to provide inductive coupling therebetween, one of said inductors having overlapping end portions electrically separated to provide a capacitor in series with said one inductor, the other inductor having its ends spaced apart, and means supporting said last mentioned ends in fixed relation.

7. A radio frequency device including a stamped metal chassis having two separate inductors integrally formed therewith which are arranged to provide inductive coupling therebetween, one of said inductors having overlapping end portions electrically separated to provide a capacitor in series with said one inductor, the other inductor having its ends spaced apart, a bridging insulator member supporting said last mentioned ends in fixed relation, and a flux-shunting member positioned inside said other inductor and adjustably supported by said insulator member.

8. A radio frequency device including a stamped metal chassis having two separate inductors integrally formed therewith which are arranged to provide inductive coupling therebetween, one of said inductors having overlapping end portions electrically separated to provide a capacitor in series with said one inductor, the other inductor having its ends spaced apart, and a capacitor provided on one of said last mentioned ends and being constituted by a metal plate electrically separated from said one end.

9. A radio frequency device including a stamped metal chassis having two separate inductors integrally formed therewith which are arranged to provide inductive coupling therebetween, one of said inductors having overlapping end portions electrically separated to provide a capacitor in series with said one inductor, the other inductor having its ends spaced apart, and a vacuum tube supported on said chassis with certain of its exposed leads being disposed immediately adjacent said last mentioned ends and being electrically connected thereto.

10. A radio frequency device including a stamped metal chassis having two separate inductors integrally formed therewith which are arranged to provide inductive coupling therebetween, one of said inductors having overlapping end portions electrically separated to provide a capacitor in series with said one inductor, the other inductor having its ends spaced apart, a vacuum tube supported on said chassis with certain of its exposed leads being disposed immediately adjacent said last mentioned ends and being electrically connected thereto, an insulating support secured to said chassis adjacent said tube, and a capacitor carried by said insulating support immediately adjacent certain of the exposed leads of said tube and being electrically connected thereto.

11. A radio frequency device including a metal chassis having formed integrally therewith an inductor, said inductor having flat parallel overlapping ends which serve as plates of a variable capacitor, a dielectric material interposed between said ends and serving to insulate said ends from each other, said ends having openings therethrough which are in registry, and adjusting means received through said openings and operable to vary the spacing between said ends to vary the capacity of the aforementioned capacitor and further to vary the resonant frequency of the inductor and capacitor combination.

12. A radio frequency device including a flat sheet metal chassis having a plane top surface, two inductors formed of a portion of said chassis and comprising integral lengths of material struck from said chassis and bent to provide inductor loops, said loops lying in parallel planes spaced apart and at right angles to said top surface, the first of said inductors having plate-like overlapping ends which serve as a capacitor, the second inductor having end portions rigidly held in spaced relation, and a vacuum tube supported in inverted position on said chassis with one end being rigidly positioned with respect to said top surface and the other end disposed adjacent said end portions of the second inductor, the leads of said tube emerging from the last-mentioned tube end, at least one of said leads being electrically connected to said portions of the second inductor.

13. A radio frequency device including a sheet metal chassis having a top plane surface, an inductor formed of a portion of said chassis and consisting of two integral lengths of sheet metal struck from said chassis and bent upwardly away from said plane surface, said lengths further having the ends thereof bent inwardly toward each other into overlapping relation to provide an inductor loop which lies in a plane perpendicular to said plane surface, said ends being flat plates lying in parallel planes, and means operatively connected to said ends to position them in spaced relation whereby said plates serve as elements of a capacitor connected between the ends of said inductor.

14. A radio frequency device including a sheet metal chassis having a top plane surface, an inductor formed of a portion of said chassis and consisting of a portion of sheet metal struck from said chassis and bent into a loop lying in a plane perpendicular to said plane surface, and end portions of said loop being disposed in overlapping relation, said end portions being flat plates lying in spaced parallel planes, said plates serving as elements of a capacitor connected between the ends of said inductor.

15. A radio frequency device including a metal chassis having formed integrally therewith an inductor, said inductor having flat parallel overlapping ends which serve as plates of a variable capacitor, and adjusting means operatively associated with said ends and operable to vary the spacing therebetween to vary the capacity of the aforementioned capacitor and further to vary the resonant frequency of the inductor and capacitor combination.

16. A radio frequency device including a sheet metal chassis having a top plane surface, an inductor formed of a portion of said chassis and consisting of a portion of sheet metal struck from said chassis and bent into a loop lying in a plane angularly related to said plane surface, and end portions of said loop being disposed in overlapping relation, said end portions being flat plates lying in spaced parallel planes, said plates serving as elements of a capacitor connected between the ends of said inductor.

References Cited in the file of this patent

UNITED STATES PATENTS

| Number | Name | Date |
|---|---|---|
| 1,647,474 | Seymour | Nov. 1, 1927 |
| 1,731,894 | Frisch | Oct. 15, 1929 |
| 2,027,935 | Saar | Jan. 14, 1936 |
| 2,059,299 | Yolles | Nov. 3, 1936 |
| 2,154,406 | Marholz | Apr. 11, 1939 |
| 2,395,520 | Toth | Feb. 26, 1946 |
| 2,413,451 | Johnson | Dec. 31, 1946 |
| 2,414,280 | Thomas | Jan. 14, 1947 |
| 2,471,155 | Langmuir, et al. | May 24, 1949 |
| 2,543,891 | Carlson, et al. | Mar. 6, 1951 |

FOREIGN PATENTS

| Number | Country | Date |
|---|---|---|
| 647,189 | France | July 24, 1928 |